(12) United States Patent
Neber

(10) Patent No.: US 10,801,630 B2
(45) Date of Patent: Oct. 13, 2020

(54) FLUID DISTRIBUTOR

(71) Applicant: Matthew Neber, Homestead, FL (US)

(72) Inventor: Matthew Neber, Homestead, FL (US)

( * ) Notice: Subject to any disclaimer, the term of this patent is extended or adjusted under 35 U.S.C. 154(b) by 110 days.

(21) Appl. No.: 16/184,996

(22) Filed: Nov. 8, 2018

(65) Prior Publication Data

US 2020/0149643 A1  May 14, 2020

(51) Int. Cl.
*F16K 11/087* (2006.01)
*F16K 27/06* (2006.01)
*F16K 31/05* (2006.01)

(52) U.S. Cl.
CPC ........ *F16K 11/0873* (2013.01); *F16K 27/067* (2013.01); *F16K 31/055* (2013.01)

(58) Field of Classification Search
CPC .... F16K 11/087; F16K 11/0876; F16K 27/06; F16K 27/067; F16K 31/04; F16K 31/041; F16K 31/05; F16K 31/055; F16K 5/0626; F16K 5/0636; F16K 11/0856
See application file for complete search history.

(56) References Cited

U.S. PATENT DOCUMENTS

| | | | | |
|---|---|---|---|---|
| 2,129,231 A * | 9/1938 | Parker | ............... | F16K 11/0856 137/625.19 |
| 2,961,586 A * | 11/1960 | Morrell | ............... | F16K 31/00 318/611 |
| 3,700,006 A * | 10/1972 | Marcillaud | ......... | F16K 11/0873 137/625.21 |
| 3,908,697 A * | 9/1975 | Witzel | ............... | F16K 11/0836 137/625.47 |
| 4,538,789 A * | 9/1985 | An | ............... | F16K 5/0442 251/129.12 |
| 4,889,315 A * | 12/1989 | Imanaga | ............... | F16K 31/055 251/129.03 |
| 8,813,783 B2 * | 8/2014 | Morris | ............... | F16K 11/0856 137/625.18 |
| 9,670,825 B2 * | 6/2017 | Murakami | ............ | F16K 11/085 |
| 9,897,217 B2 * | 2/2018 | Greene | ............... | F16K 5/201 |
| 9,932,882 B2 * | 4/2018 | Imasaka | ............... | F01P 7/16 |
| 10,344,883 B2 * | 7/2019 | Brazas | ............... | F16K 11/0876 |
| 2007/0113575 A1 * | 5/2007 | Borre | ............... | F25B 45/00 62/292 |
| 2008/0169443 A1 * | 7/2008 | Loloff | ............... | F16K 11/0873 251/315.1 |
| 2016/0003125 A1 * | 1/2016 | Lee | ............... | F01P 3/02 123/41.08 |
| 2018/0259982 A1 * | 9/2018 | Halimi | ............... | F16K 31/055 |
| 2018/0298988 A1 * | 10/2018 | Hsu | ............... | F16K 31/055 |
| 2018/0347720 A1 * | 12/2018 | Mariano | ............... | F16K 5/0652 |

* cited by examiner

*Primary Examiner* — David Colon-Morales
(74) *Attorney, Agent, or Firm* — Albert Bordas, P.A.

(57) ABSTRACT

An in-line fluid distributor having either or both manual and remote control capability is disclosed. The fluid distributor integrates several typically separated components into a single sealed unit that incorporates a plurality of uni- and bi-directional input and output ports. By integrating the fluid distribution and control components into an integral single device, problems relating to size, system and connection leakage, maintenance, and accessibility are largely reduced or eliminated. The fluid distributor has limited number of components thereby simplifying manufacture and potential repair. By design the fluid distributor may be used for the controlled distribution of any fluid, whether liquid or gas.

8 Claims, 5 Drawing Sheets

FLUID DISTRIBUTOR

FIELD OF THE INVENTION

The present invention generally relates to fluid control valves, and more particularly relates to fluid distributors and control valves that are manually and/or remotely controlled, and which are integrally formed into a single sealed unit. In one example embodiment, the fluid distributor is designed to incorporate the typically disparate components into a single compact device, including valves, couplings, seals, motors, controllers, and housings.

BACKGROUND OF THE INVENTION

Fluid distribution and fluid control systems and devices are used as critical components in many systems ranging from simple water, gas, or oil plumbing distribution systems within a residence, to petroleum, hydraulic fluid, liquid or gas fluid distributions systems within motor vehicles (including automobiles and watercraft), and aerospace vehicles, including spacecraft. Standard fluid and pneumatic distribution systems and devices include multiple, typically disparate plumbing of flow control components. Such components include, but are not limited to, valves, fittings, couplers, seals, clamps, hoses, tubing or fluid lines, controllers (manual or remote), and various piping to which the hoses, tubing or fluid lines are connected. Moreover, in certain system or device implementations, there may also be the need for one or more filters, screens, or separators positioned within the fluid distribution system, often times upstream or downstream of the valves.

At each point where there is a connection between two or more components, there is a potential for leakage or disruption of a sealed system. Such leakage or fluid flow disruption can be problematic, disrupting or impairing the operation or effectiveness of the overall system, or indeed, in certain critical circumstances, may be catastrophic.

As indicated above, fluid distributors are used in a wide variety of systems and industrial plants. Many such systems are in vehicles, including watercraft, automobile, and aerospace. Each of these latter applications often times involve the installation of fluid distributors in limited volume or confined locations, such as marine bilge compartments, engine rooms, airfoil or fuselage cavities and locations, and heavy and industrial machinery and industrial plants. Such installations require that the fluid distributor be fairly or very compact. Such installations and uses are often times not readily accessible for assembly, installation, inspection, or maintenance.

Various designs for distribution apparatus and systems have been designed and are obviously in wide-spread use, including those by Koch-Glitsch, LP. However, no such prior art systems appear to provide a solution to above noted problems, nor appear to have achieved wide acceptance to address the need for a compact uni-directional and/or bi-directional manual and/or remote controlled fluid distributor.

Accordingly what is needed in the fluid distribution technical field is a compact, sealed fluid distributor that provides a plurality of uni-directional and/or bi-directional valves and distribution lines that may be manually and/or remotely controlled through a servo-motor, and which incorporates all necessary fluid distribution components into an integrally formed sealed device or apparatus. Such devices do not appear to have been fully and specifically designed or used in the relevant prior art.

SUMMARY OF THE INVENTION

The present invention overcomes the disadvantages of the prior art and fulfills the needs described above by providing a compact, sealed fluid distributor with a plurality of uni- or bi-directional ports or orifices that may be manually and/or remotely controlled.

A preferred aspect of the invention is a fluid distribution device, comprising a fluid distribution device housing having at least one housing port; a distribution device housing face panel having a plurality of face panel ports, wherein said distribution device housing face is formed to mate with a side of said fluid distribution device housing; a rotatable hollow spindle, having a plurality of valves, said rotatable hollow spindle rotatably fitting within said fluid distribution device housing and capable of fluidically interconnecting said at least one port on said fluid distribution device housing with at least one of said plurality of ports on said distribution device housing face; a control knob integrally connected to an end of said rotatable hollow spindle; and a servo-controlled motor interconnected with and rotatably controlling said rotatable hollow spindle.

Another preferred aspect of the invention is a fluid distribution system, comprising (a) a plurality of fluid distribution lines for carrying a fluid between locations; (b) at least one particle separator located within at least one of said fluid distribution lines; and (c) a fluid distribution device housing comprising (i) at least one housing port fluidically connected to one of said fluid distribution lines; (ii) a distribution device housing face panel having a plurality of face panel ports, with each said plurality of face panel ports being fluidically connected to one of said fluid distribution lines, wherein said distribution device housing face is formed to mate with a side of said fluid distribution device housing; (iii) a rotatable hollow spindle, having a plurality of valves, said rotatable hollow spindle rotatably fitting within said fluid distribution device housing and capable of fluidically interconnecting said at least one port on said fluid distribution device housing with at least one of said plurality of ports on said distribution device housing face; (iv) a control knob integrally connected to an end of said rotatable hollow spindle; and (v) a servo-controlled motor interconnected with and rotatably controlling said rotatable hollow spindle.

BRIEF DESCRIPTION OF THE DRAWINGS

For the purposes of illustrating the invention, the attached drawings show several aspects and embodiments that are presently preferred. However, it should be understood that the invention is not limited to the precise arrangement and configuration shown in the accompanying drawings.

DETAILED DESCRIPTION OF SEVERAL EMBODIMENTS

The following provides a disclosure of an inventive fluid distributor device, apparatus, and system having as primary features that it is compact, sealed, having a plurality of uni-directional or bi-directional valves and ports to manually or remotely control distribution of most any fluid. The primary elements, as further described and shown in this specification, include the distributor housing having at least one port, the distributor housing interface panel having a plurality of ports, an interior spindle having a plurality of valves, a motor or servo-controller, and a coupling between the motor and interior spindle to provide remote motor control of the valves and fluid distribution.

Figure 1:
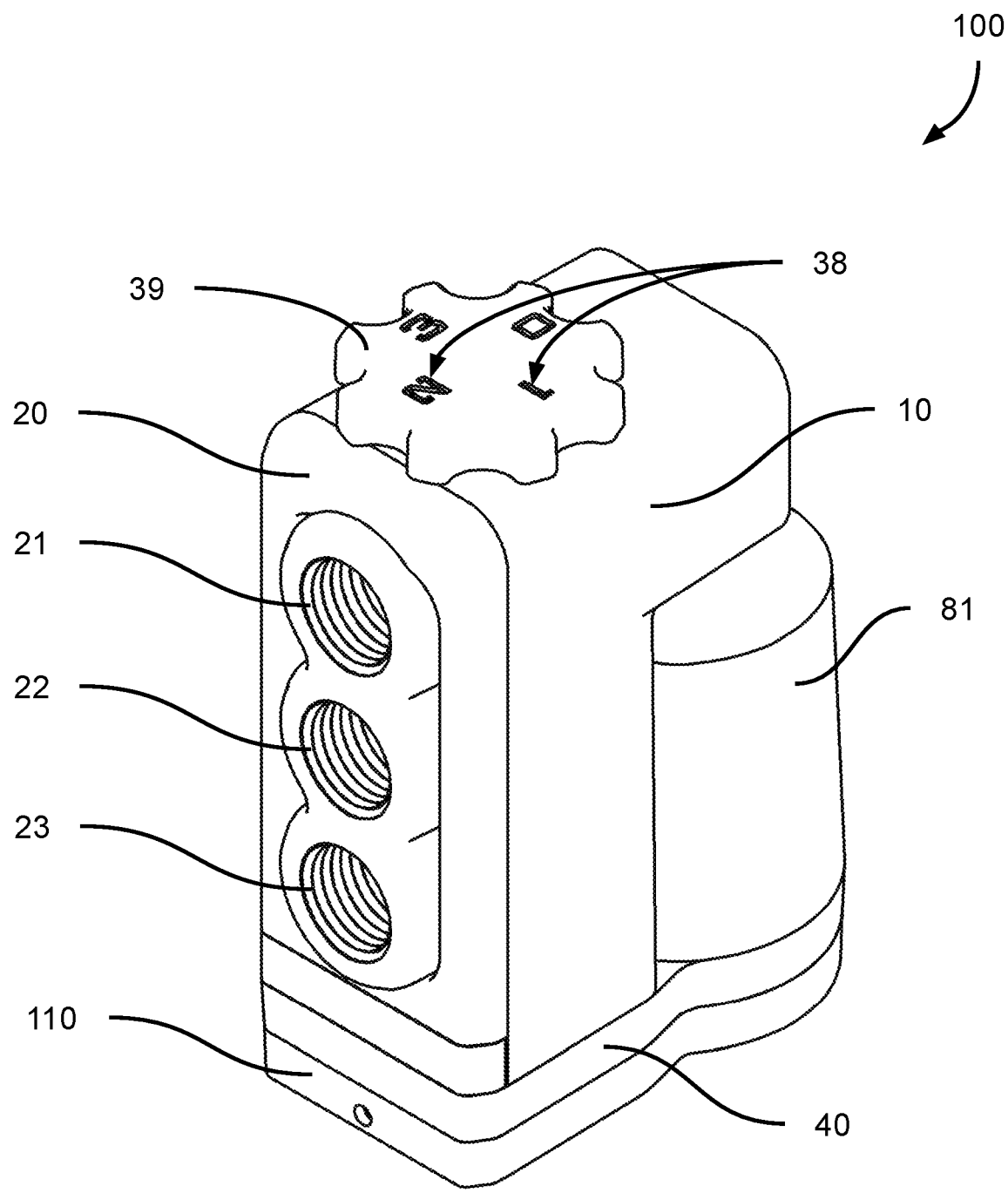
FIG. 1: is a front perspective view of an exemplary embodiment of the present inventive fluid distributor shown with one input port and three exit ports.
Figure 2:
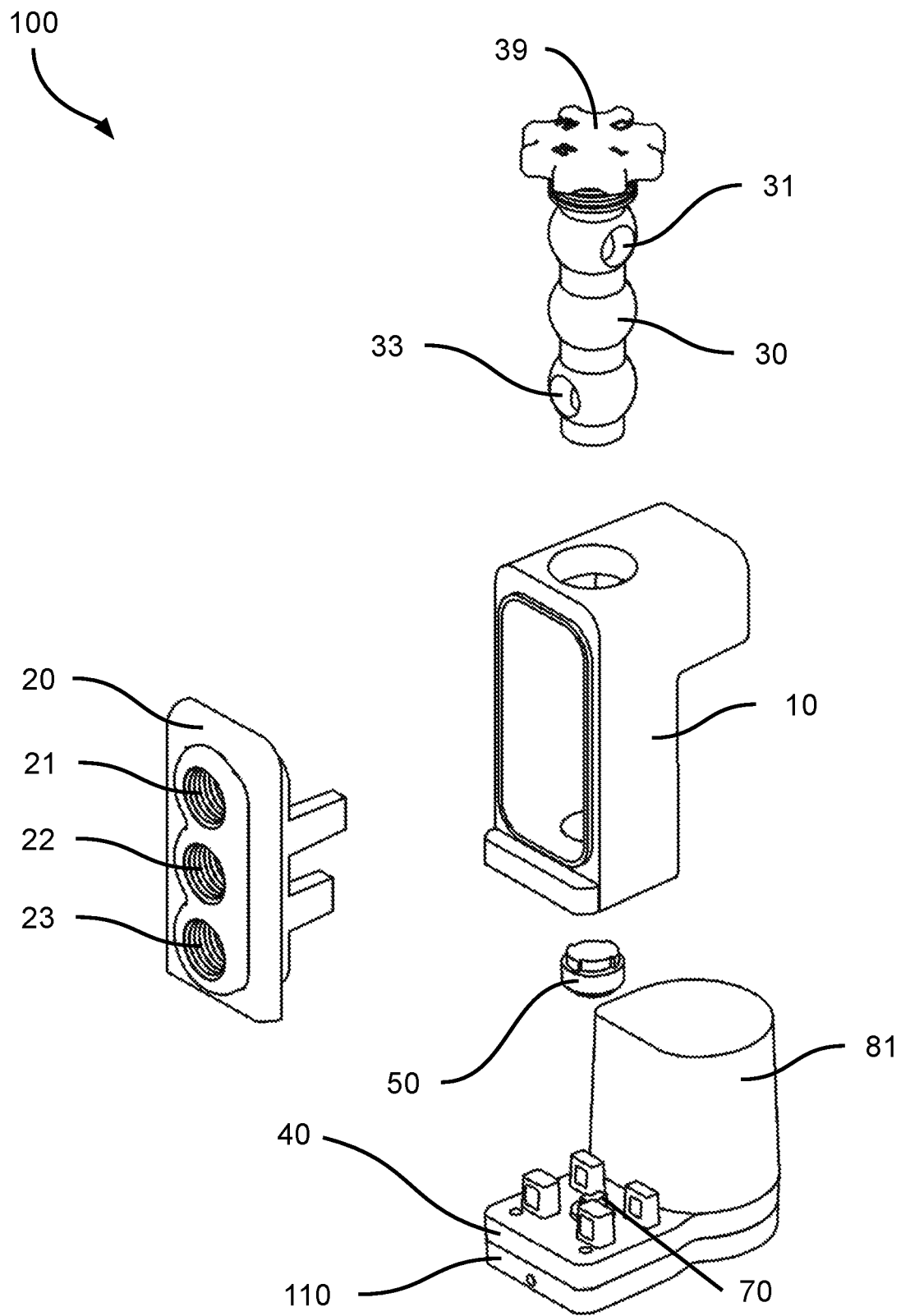
FIG. 2: is a front perspective, exploded view of an exemplary embodiment of the present inventive fluid distributor having one input and three exit ports.
Figure 3:
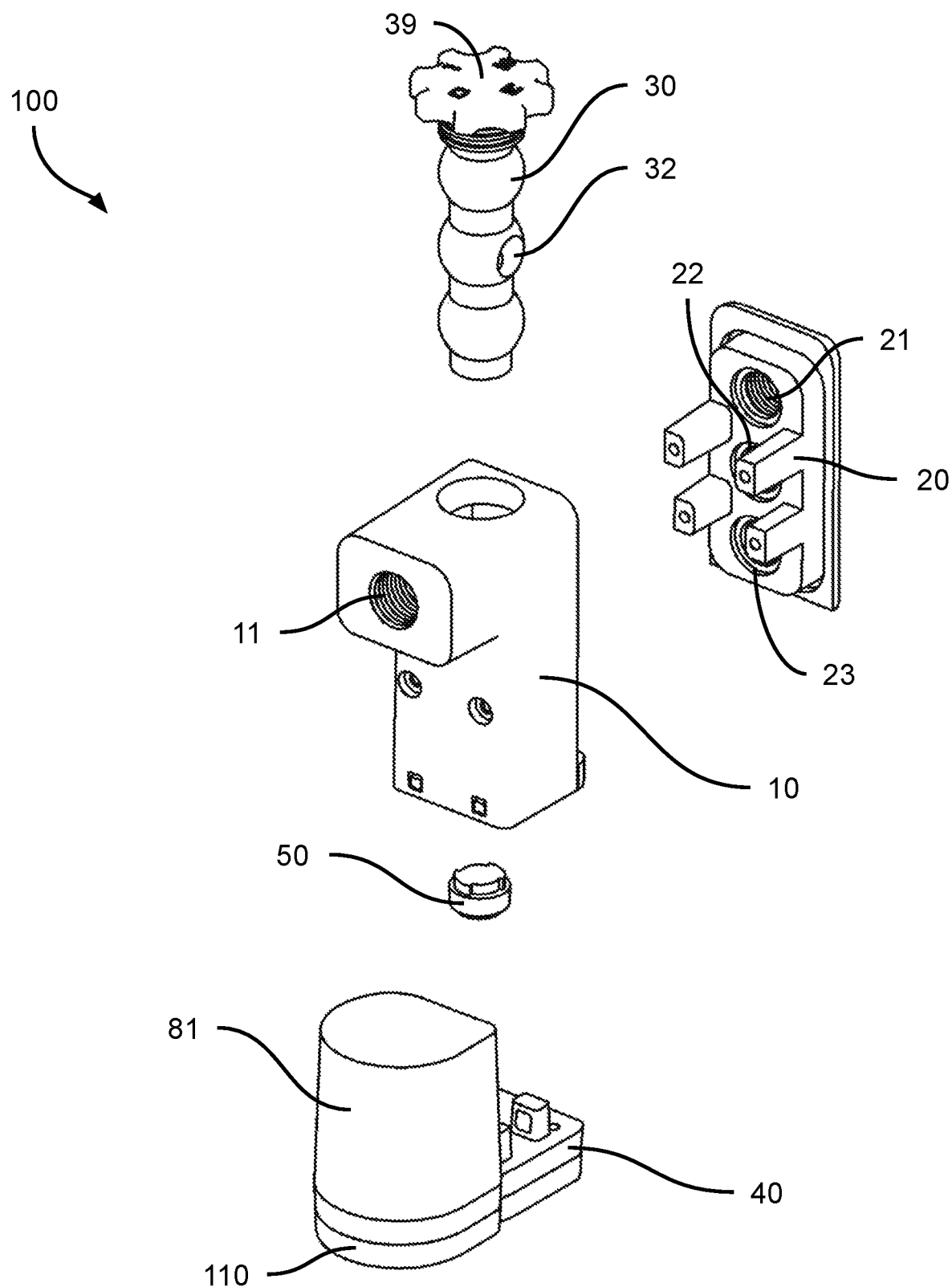
FIG. 3: is a rear perspective, exploded view of an exemplary embodiment of the present inventive fluid distributor having one input and three exit ports.

In more specific detail, in one embodiment as shown in FIGS. 1 and 2, the innovative fluid distributor 100 has a limited number of integrated components to create a compact, sealed apparatus having utility for many different fluid distribution applications. More specifically, as shown in exploded views in FIGS. 2, 3, and 4, an exemplary embodiment of the fluid distributor comprises a distributor housing 10, having a distributor housing interface or face panel 20. Interface panel 20 has a plurality of ports or orifices 21, 22, 23 that may be uni-directional or bidirectional. Distributor housing 10 similarly has at least one port or orifice 11 as shown in FIG. 3.

Rotatably positioned within the distributor housing 10 is a hollow valve shaft or spindle 30. Valve shaft 30 is formed with a plurality of ball valves 31, 32, 33 such that with the valve shaft 30 in position within distributor housing 10, each of the ball valves 31, 32, 33 are precisely positioned adjacent to interface panel 20 ports 21, 22, 23, and with at least one of the ball valve 31, 32, 33 similarly being precisely positioned adjacent to distributor housing 10 port 11. Valve shaft 30 has a manual control knob 39 that may be formed with indicia 38 to show which port is open as a function of the rotated position of valve shaft 30.

These primary components disclose the basic operation of the fluid distributor. By way of flow distribution example, as shown in FIGS. 2 and 3, fluid entering through distributor housing port 11 flows into ball valve 31 and into valve shaft 30 so long as the valve shaft is rotated, at least partially, to allow for fluid flow into ball valve 31. Once within valve shaft 30, the fluid may then be directed or distributed to ports 21, 22, 23 depending upon the rotated position of valve shaft 30 that aligns ball valve 31,32,33 with whichever port 21, 22, 23 it is desired that the fluid should be distributed to.

In a more specific example, to distribute or control water to multiple irrigation systems, water entering through distributor housing port 11 is directed to output ports 21, 22, 23 depending upon the rotated position of valve shaft 30. If positioned such that ball valve 31 is aligned and fluidly communicating with port 21, the water is directed and distributed to the irrigation system connected with port 21. Similarly, if the ball valve 32 or 33 is aligned and fluidly communicating with ports 22 or 23, then the water is directed and distributed to the irrigation systems connected to ports 22 or 23.

In view of the design of the fluid distributor 100 and the core components, the valves and ports may each be uni-directional, as described in the above water distribution example, or may be bi-directional permitting the fluid to flow in both directions.

While the configuration of valve shaft 30 is shown as having each ball valve 31, 32, 33 being mutually exclusive in terms of fluid distribution, meaning that if there is fluid communication between ball valve 31 and port 21, then there is no fluid communication with ball valve 32 and port 22, or ball valve 33 and port 33, in an alternative embodiment, the valve shaft may be configured and designed to permit simultaneous fluid distribution to one or more of the output ports 21, 22, 23 depending upon the position of the valve shaft 30. Given the bidirectional capability of the fluid distributor 100, in such a configuration, the fluid distributor 100 may be used as a mixing device to allow for mixing of fluids from disparate sources into a single output.

Figure 4:
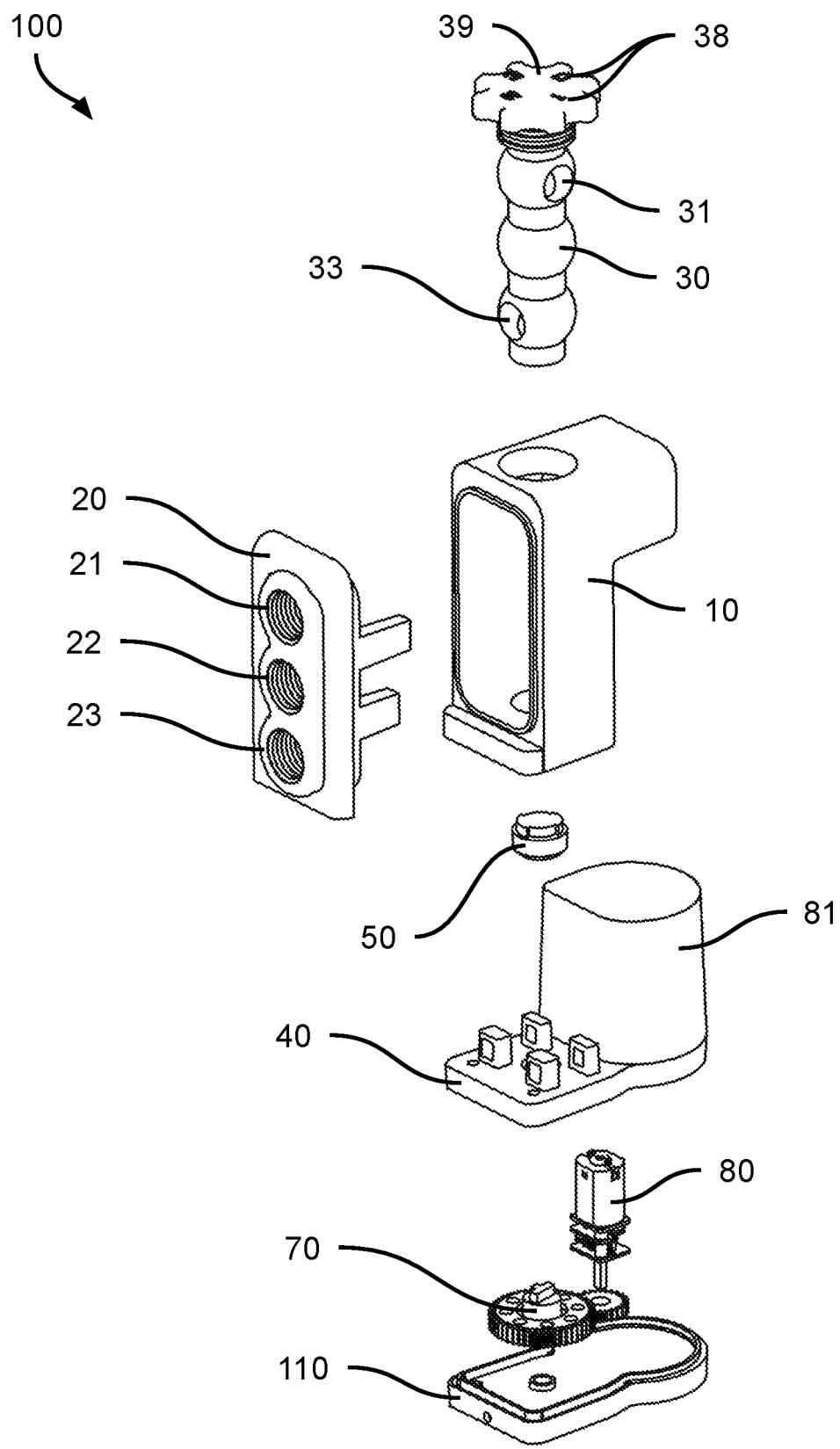
FIG. 4: is another front perspective, exploded view showing exemplary details of the rotatable spindle.

Control of the fluid distributor 100, and specifically control of the rotational position of the valve shaft 30 may also be provided by a motor or servo-controller 80 as shown in FIGS. 2 through 4. Motor is positioned under motor housing 81 and is rotationally connected to, and capable of driving a motor or drive coupling 70 as shown in FIG. 4. The drive coupling 70 directly engages with the bottom of valve shaft 30 at the bottom of distributor housing 10. As shown in FIGS. 1 through 7, a lower housing 40 provides the base to which distributor housing 10 and motor housing 81 connect to form the integral fluid distributor 100.

To ensure fluid sealing within the distributor housing 10, a seal 50 is positioned at the bottom of distributor housing 10 where the drive coupling 70 engages with the valve shaft 30. The motor or servo-controller 80 allows for remote control of the fluid distributor 100 through a wireless signal including Bluetooth®, cellular, wi-fi, near-field communication protocols, or other similar signal transmission platforms. The signal receiver (or transponder-transmitter and receiver) to control the motor 80 through a wireless link may be positioned within motor housing 81 in view of the fact that such receiver and transponder units are very compact in size and draw very little power. Accordingly, a small battery (not shown), similar to a watch or hearing aid battery, may be readily incorporated with the receiver board and located within the motor housing 81.

Figures 5, 6:
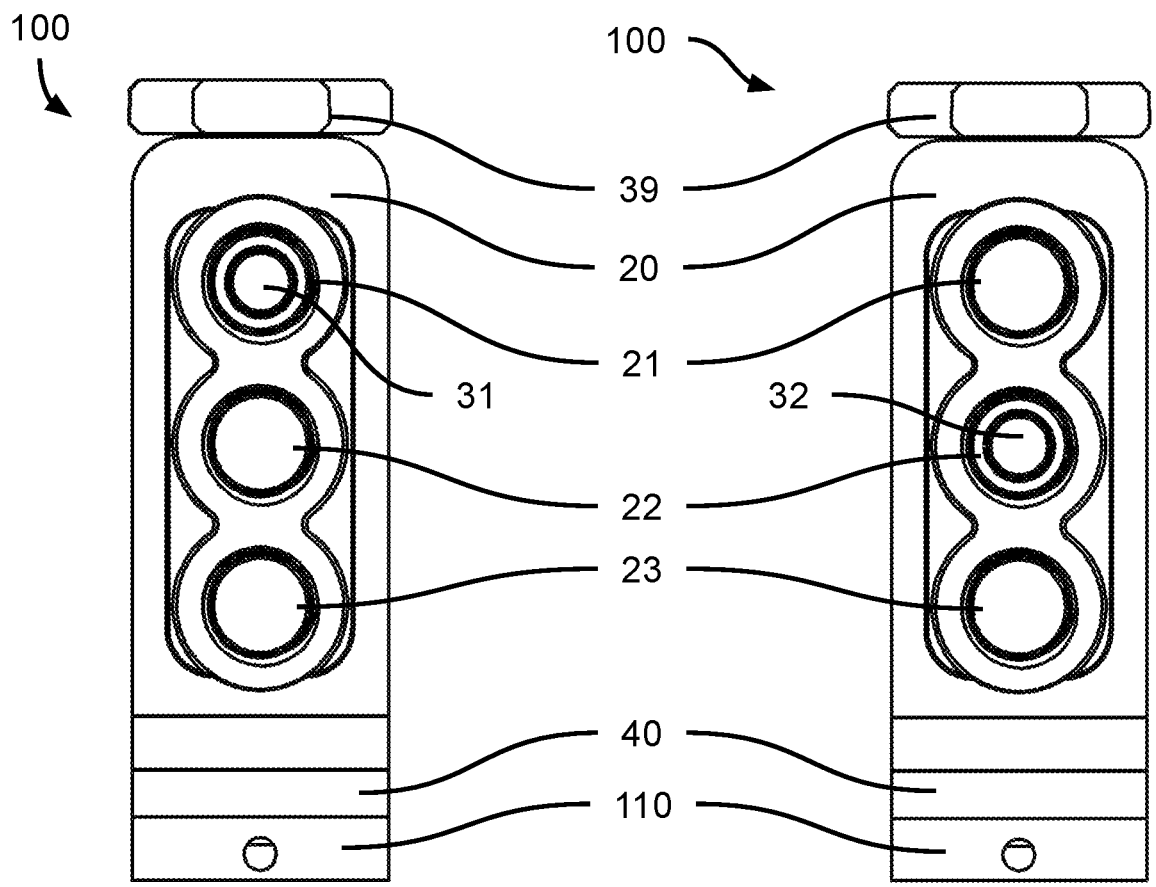
FIG. 5: is a front view of an exemplary embodiment showing the distributor with the top panel port open.
FIG. 6: is a front view of an exemplary embodiment showing the distributor with the middle panel port open.
Figure 7:
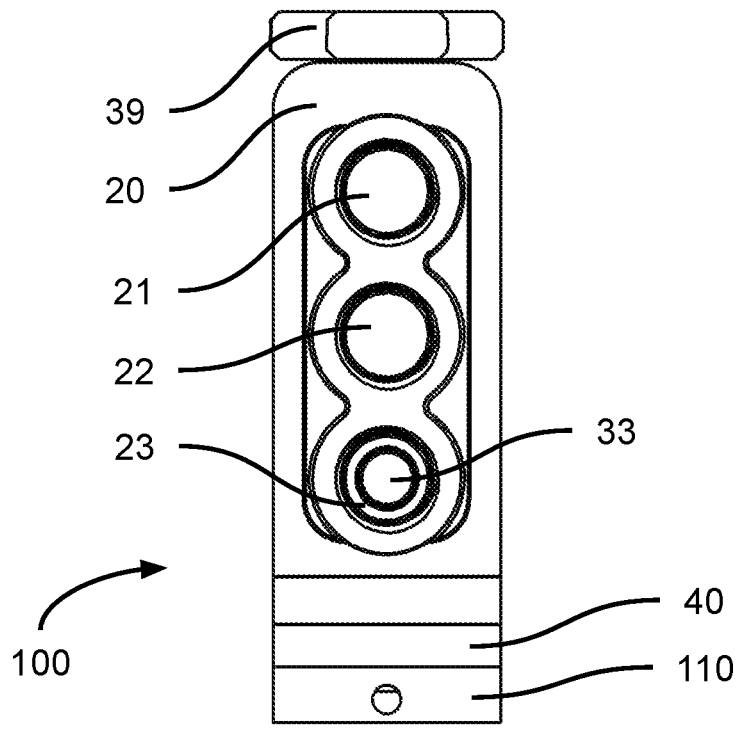
FIG. 7: is a front view of an exemplary embodiment showing the distributor with the bottom panel port open.

By design, the fluid distributor is compact and sealed, to allow for locating and positioning in restricted or confined spaces. As shown in FIG. 5, a mounting bracket 110 may be used to rigidly attach the fluid distributor 100 to any available support element in the system where the fluid distributor 100 needs to be located.

Not shown, but readily incorporated within the fluid distributor 100, or located upstream or downstream of the fluid distributor 100, may be one or more filters or particle separators to filter out dirt or other materials from the fluid flow. Such filters may be readily incorporated into one or more of the ports 11, 21, 22, 23, or attached within the fluid lines that attach to the fluid distributor 100 at one or more of the ports.

The components of the fluid distributor are by design limited and simplified for ease of fabrication and ease of assembly. Depending upon the fluid that is to be distributed by the device, the materials used for each of the components may vary. In most any application, the core elements may be fabricated through plastic injection, blow or centrifugal molding, or metal injection molding. Additional means of fabricating some of the components, may be through 3D printing, CNC machining, metal or polymer forming, and/or the stamping of elements using various plastics, polymers, and/or metal materials. For ease of manufacturing, some of the components may be separately formed and then integrated into an integral unit through use of adhesive, glues, epoxies or ultrasonic bonding or welding.

While preferred embodiments of the inventive apparatus, device, and distributor have been described and disclosed, in particular by reference to certain figures and exemplary embodiments relating to an integral, sealed fluid distributor, such disclosed and shown distributors are not to be construed as limiting the scope of application of the inventive devices or apparatus. For example, while a certain number of ports, orifices, and related valves are shown, alternative configurations, including more ports and valves, or less ports and valves may be provided in the distributor, and different shapes to the housings may be provided, all of which may be effectively operational as fluid distributors.

It will be recognized by those skilled in the art that other modifications, substitutions, and/or other applications are possible and all such modifications, substitutions and applications are within the true scope and spirit of the present invention. It is likewise understood that the above disclosure and attached claims are intended to cover all such modifications, substitutions, and/or applications.

What is claimed is:

1. A fluid distribution device, comprising:
    a. a fluid distribution device housing having at least one housing port;
    b. a distribution device housing face panel having a plurality of face panel ports, wherein said distribution device housing face is formed to mate with a side of said fluid distribution device housing;
    c. a rotatable hollow spindle, having a plurality of valves, said rotatable hollow spindle rotatably fitting within said fluid distribution device housing and capable of fluidically interconnecting said at least one port on said fluid distribution device housing with at least one of said plurality of ports on said distribution device housing face;
    d. a control knob integrally connected to an end of said rotatable hollow spindle; and
    e. a servo-controlled motor interconnected with and rotatably controlling said rotatable hollow spindle.

2. The fluid distribution device, as in claim 1, having one intake housing port and three face panel output ports.

3. The fluid distribution device, as in claim 1, wherein said fluid distribution device is used to control and distribute fuel.

4. The fluid distribution device, as in claim 1, wherein said fluid distribution device is used to control and distribute liquid.

5. The fluid distribution device, as in claim 1, wherein said fluid distribution device is used to control and distribute a gas.

6. The fluid distribution device, as in claim 1, wherein said fluid distribution device is used to control and distribute hydraulic oil.

7. A fluid distribution device, comprising:
    a. a main distributor housing having at least one port;
    b. a rotatable hollow spindle, said spindle integrally formed with a plurality of ball valves, wherein said rotatable spindle rotatably fits within said main distributor housing;
    c. a control knob integrally connected to an end of said rotatable hollow spindle;
    d. a distributor housing face panel having a plurality of ports, wherein said distributor housing face attaches to a side of said main distributor housing;
    e. a servo-controlled motor interconnected with and rotatably controlling a spindle coupling;
    f. a motor housing covering said servo-controlled motor;
    g. a distributor housing base to which said servo-controlled motor, said motor housing, and said spindle coupling are attached; and
    h. a mounting component attachable to said fluid distribution device for mounting said fluid distribution device to a separate physical support.

8. A fluid distribution system, comprising:
    a. a fluid distribution device housing comprising:
        i. at least one housing port fluidically connected thereto;
        ii. a distribution device housing face panel having a plurality of face panel ports, wherein said distribution device housing face is formed to mate with a side of said fluid distribution device housing;
        iii. a rotatable hollow spindle, having a plurality of valves, said rotatable hollow spindle rotatably fitting within said fluid distribution device housing and capable of fluidically interconnecting said at least one port on said fluid distribution device housing with at least one of said plurality of ports on said distribution device housing face;
        iv. a control knob integrally connected to an end of said rotatable hollow spindle; and
        v. a servo-controlled motor interconnected with and rotatably controlling said rotatable hollow spindle.

* * * * *